(12) United States Patent
Webber et al.

(10) Patent No.: US 10,760,398 B2
(45) Date of Patent: Sep. 1, 2020

(54) DOWNHOLE SAND AND GAS SEPARATION SYSTEM FOR USE WITH A ROD PUMP

(71) Applicant: FORUM US, INC., Houston, TX (US)

(72) Inventors: Andrew Webber, Hockley, TX (US); Matthew Tully, Katy, TX (US)

(73) Assignee: FORUM US, INC., Houston, TX (US)

( * ) Notice: Subject to any disclaimer, the term of this patent is extended or adjusted under 35 U.S.C. 154(b) by 132 days.

(21) Appl. No.: 16/137,205

(22) Filed: Sep. 20, 2018

(65) Prior Publication Data

US 2019/0093467 A1 Mar. 28, 2019

Related U.S. Application Data

(60) Provisional application No. 62/563,813, filed on Sep. 27, 2017.

(51) Int. Cl.
*E21B 43/38* (2006.01)
*E21B 43/12* (2006.01)
*B01D 45/16* (2006.01)

(52) U.S. Cl.
CPC .............. *E21B 43/38* (2013.01); *B01D 45/16* (2013.01); *E21B 43/127* (2013.01); *B01D 2221/04* (2013.01)

(58) Field of Classification Search
CPC ....... E21B 43/38; E21B 43/127; B01D 45/16; B01D 2221/04
See application file for complete search history.

(56) References Cited

U.S. PATENT DOCUMENTS

| | | | |
|---|---|---|---|
| 5,662,167 A * | 9/1997 | Patterson | ........... B01D 21/0003 166/105.1 |
| 6,394,183 B1 | 5/2002 | Schrenkel et al. | |
| 2010/0175869 A1 | 7/2010 | Cobb | |
| 2014/0158343 A1 | 6/2014 | Cobb et al. | |

OTHER PUBLICATIONS

PCT International Search Report/Written Opinion dated Dec. 14, 2019 for Application No. PCT/US2018/052035.

* cited by examiner

*Primary Examiner* — David J Bagnell
*Assistant Examiner* — Yanick A Akaragwe
(74) *Attorney, Agent, or Firm* — Patterson + Sheridan LLP

(57) ABSTRACT

A sand and gas separation system for use with a rod pump. The system comprises an upper separator configured to separate out gas from wellbore fluids prior to flowing into the rod pump. The system further comprises a lower separator configured to separate out sand from wellbore fluids prior to flowing into the upper separator. The upper and lower separators are coupled together by a mechanical coupling.

20 Claims, 1 Drawing Sheet

DOWNHOLE SAND AND GAS SEPARATION SYSTEM FOR USE WITH A ROD PUMP

CROSS-REFERENCE TO RELATED APPLICATIONS

This application claims benefit of U.S. Provisional Patent Application Ser. No. 62/563,813, filed on Sep. 27, 2017, which is expressly incorporated herein by reference in its entirety.

BACKGROUND

Field

Embodiments of the disclosure generally relate to a downhole system configured to separate sand and gas from wellbore fluids produced by a rod pump.

Description of the Related Art

Downhole pumps are used in the hydrocarbon exploration and production industry in various applications, and in particular for the production of hydrocarbons to surface from significant wellbore depths. There are several types of downhole pumps in use, including rod pumps.

A rod pump is typically located at the bottom of the production tubing and has a sucker rod string that extends to the surface. A plunger and a traveling valve are coupled to the bottom end of the sucker rod string. The sucker rod string is reciprocated up and down to stroke the plunger and the traveling valve to pump production fluid up to the surface. The operating life of a rod pump can be significantly reduced by sand and gas being present in the production fluid, and the amount of sand and gas which is produced from a well depends on characteristics of the formation.

Therefore there is a need for new and improved systems configured to remove sand and gas from production fluids that are pumped to surface by rod pumps.

SUMMARY

In one embodiment, a sand and gas separation system for use with a rod pump comprises an upper separator configured to separate out gas from wellbore fluids prior to flowing into the rod pump; and a lower separator configured to separate out sand from wellbore fluids prior to flowing into the upper separator, wherein the upper and lower separators are coupled together by a mechanical coupling.

In one embodiment, a production string comprises a rod pump; an upper separator configured to separate out gas from wellbore fluids prior to flowing into the rod pump; a lower separator configured to separate out sand from wellbore fluids prior to flowing into the upper separator, wherein the upper and lower separators are coupled together by a mechanical coupling; and a tailpipe coupled to the lower end of the separator through which sand separated out by the lower separator flows into.

BRIEF DESCRIPTION OF THE DRAWINGS

The appended drawings illustrate only typical embodiments and are therefore not to be considered limiting of the scope of the disclosure.

DETAILED DESCRIPTION

Figure 1:
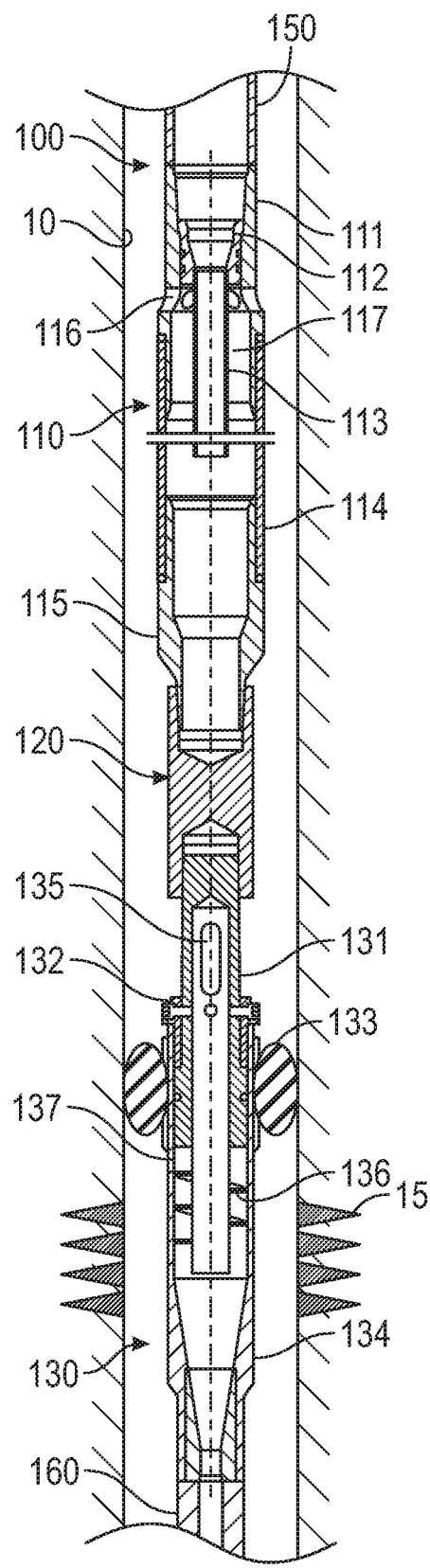
FIG. 1 is a sectional view of a downhole sand and gas separation system in a run-in position according to one embodiment.

FIG. 1 is a sectional view of a production string that is run into a wellbore 10. The portion of the production string that is shown includes a rod pump 150, a sand and gas separation system 100, and a tailpipe 160. The sand and gas separation system 100 is coupled to the bottom end of the rod pump 150. The tailpipe 160 is coupled to the bottom end of the sand and gas separation system 100.

The wellbore 10 has been previously perforated as illustrated by several perforation clusters 15 adjacent a formation of interest. The production string is lowered into the wellbore 10 to a position where the sand and gas separation system 100 is adjacent to the perforation clusters 15, and in particular where a packing element 133 is located as close to but above the perforation clusters 15. The packing element 133 forms a seal between the wellbore 10 and the production string. Fluids in the wellbore 10 may be pumped up to the surface through the production string as further described below.

The sand and gas separation system 100 includes an upper separator 110 and a lower separator 130 coupled together by a mechanical coupling 120. The upper separator 110 is configured to separate out gas from the wellbore fluids prior to flowing into the rod pump 150. The lower separator 130 is configured to separate out sand from the wellbore fluids prior to flowing into the upper separator 110. The mechanical coupling 120 is threadedly coupled to the lower end of the upper separator 110 and threadedly coupled to the upper end of the lower separator 130. The mechanical coupling 120 can be any length and/or can include multiple couplings connected together to couple and space apart the upper separator 110 relative to the lower separator 130.

The upper separator 110 includes a top sub 111 and a bottom sub 115 coupled at opposite ends to a housing 114. The top sup 111 has a plurality of inlet ports 116 to allow fluid to flow into the upper separator 110. A gas plug 112 is disposed in the top sub 111, and an inner tube 113 is coupled to the gas plug 112. A gas separation annulus 117 is formed within the top sub 111, between the outer surface of the inner tube 117 and the inner surface of the top sub 111.

The lower separator 130 includes a spinner body 131 coupled to a cyclone housing 134. The upper end of the spinner body 131 has a plurality of outlet ports 135 to allow fluid to flow out of the lower separator 130. The lower end of the spinner body 131 has a plurality of helically arranged fins 136 configured to create a vortex or cyclone of the fluid flowing into the lower separator 130. Fluid can flow into the lower separator 130 through an inlet port 137 in the cyclone housing 134. The lower end of the cyclone housing 134 has an inner tapered flow bore. The lower separator 130 further includes a collar 132 coupled to the spinner body 131, and a packing element 133 coupled to the cyclone housing 134.

Figure 2:
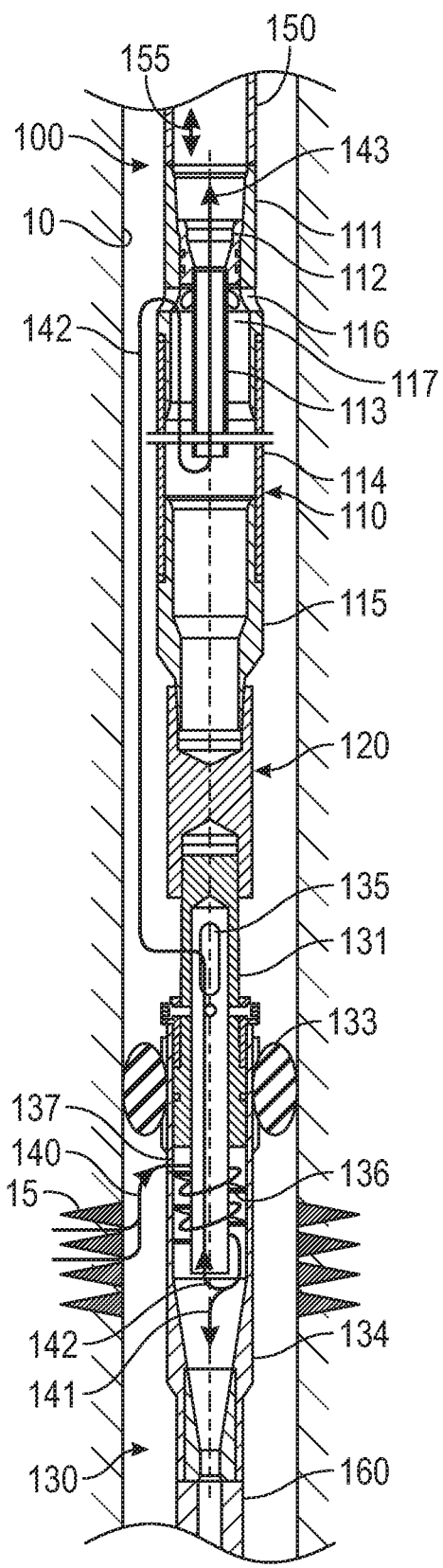
FIG. 2 is a sectional view of the downhole sand and gas separation system in an operating position according to one embodiment.

FIG. 2 is a sectional view of the sand and gas separation system 100 in an operating position according to one embodiment. As shown in FIG. 2, the rod pump 150 can begin pumping fluid back to the surface. As indicated by reference arrow 155 the rod pump is stroked up and down to draw fluid into the sand and gas separation system 100. During the rod pump 150 intake strokes, wellbore fluids located below the packing element 133 as indicated by reference arrow 140 are drawn out through the perforation clusters 15 and into the inlet port 137 of the cyclone housing 134. The fluid flows around the helically arranged fins 136 in a vortex or cyclone flow pattern toward the lower end of the cyclone housing 134.

The centrifugal force created by the vortex or cyclone flow separates out sand and other solids, which drops and flows out into the tailpipe 160 due to gravity as indicated by reference arrow 141. The inner tapered bore of the cyclone housing 134 helps funnel out the sand and other solids into the tailpipe 160. The desanded fluid as indicated by reference arrow 142 flows up through the inner bore of the spinner body 131 and out of the outlet ports 135 back into the annulus of the wellbore 10 above the packing element 133. In addition to sand and other solids, the lower separator 130 can also help consolidate and separate out gas from the desanded fluid 142.

During the rod pump 150 intake strokes, the desanded fluid 142 is pumped up into the upper separator 110 through the inlet ports 116, which are located near the upper end of the inner tube 113. The desanded fluid 142 has to travel from the inlet ports 116 down to the lower end of the inner tube 113 to be able to be pumped up to the surface. The inner tube 113 has a length and is arranged within the upper separator 110 in a manner configured to contain any gas that is in the desanded fluid 142 within the gas separation annulus 117, while allowing the desanded and degassed fluid as indicated by reference arrow 143 to separate out and be pumped up to the surface through the rod pump 150. The gas plug 112 helps contain the gases within the gas separation annulus 117.

During each intake stroke, the rod pump 150 pumps up a predetermined amount of fluid. At the end of each intake stroke, the rod pump 150 is stroked back or reset to begin another intake stroke. As the rod pump 150 is stroked back or reset, the wellbore fluids in the sand and gas separation system 100 remain momentarily and relatively static. As the wellbore fluids remain relatively static, the lighter gases in the wellbore fluids have time to float up relative to the heavier liquids and accumulate in the gas separation annulus 117. The length of the inner tube 113 and the predetermined amount of fluid that is pumped up during each intake stroke are configured such that the gases that separate out and accumulate in the gas separation annulus 117 are not given enough time to be pumped down far enough to reach the lower end of the inner tube 113. However, the desanded and degassed fluid 143 is able to flow down to the lower end of the inner tube and then up through the rod pump 150 during the intake strokes.

In this manner, the sand and gas separation system 100 is configured to help separate out both sand and other solids, as well as gases, from any wellbore fluids that are pumped up to the surface through the rod pump 150.

While the foregoing is directed to some embodiments, other and further embodiments may be devised without departing from the basic scope thereof, and the scope thereof is determined by the claims that follow.

The invention claimed is:

1. A sand and gas separation system for use with a rod pump, comprising:
   an upper separator comprising a top sub, an inner tube, and a gas separation annulus between the top sub and the inner tube, wherein the upper separator is configured to separate out gas from wellbore fluids prior to flowing into the rod pump; and
   a lower separator configured to separate out sand from wellbore fluids prior to flowing into the gas separation annulus of the upper separator, wherein the upper and lower separators are coupled together by a mechanical coupling.

2. The system of claim 1, wherein the upper separator further comprises a bottom sub, wherein the top sub and the bottom sub are coupled at opposite ends of a housing, and wherein the top sub has a plurality of ports extending from an outer surface of the top sub to an inner surface of the top sub and configured to allow wellbore fluids to flow into the upper separator.

3. The system of claim 2, wherein the upper separator further comprises a gas plug disposed in the top sub, wherein the inner tube is coupled to the gas plug, and wherein the ports of the top sub are located near an upper end of the inner tube.

4. The system of claim 3, wherein the lower separator comprises a spinner body coupled to a cyclone housing, and wherein an upper end of the spinner body has a plurality of ports extending from an outer surface of the spinner body to an inner surface of the spinner body and configured to allow wellbore fluids to flow out of the lower separator.

5. The system of claim 4, wherein a lower end of the spinner body has a plurality of helically arranged fins configured to create a vortex or cyclone of the wellbore fluids flowing into the lower separator.

6. The system of claim 5, wherein the wellbore fluids can flow into the lower separator through a port in the cyclone housing, the port extending from an outer surface of the cyclone housing to an inner surface of the cyclone housing.

7. The system of claim 6, wherein a lower end of the cyclone housing has an inner tapered flow bore.

8. The system of claim 6, wherein the lower separator further comprises a packing element.

9. The system of claim 8, wherein the port in the cyclone housing is located below the packing element, and the plurality of ports of the spinner body are located above the packing element.

10. A production string, comprising:
    a rod pump;
    an upper separator comprising a top sub, an inner tube, and a gas separation annulus between the top sub and the inner tube, wherein the upper separator is configured to separate out gas from wellbore fluids prior to flowing into the rod pump;
    a lower separator configured to separate out sand from wellbore fluids prior to flowing into the gas separation annulus of the upper separator, wherein the upper and lower separators are coupled together by a mechanical coupling; and
    a tailpipe coupled to a lower end of the lower separator through which sand separated out by the lower separator flows into.

11. The production string of claim 10, wherein the upper separator further comprises a bottom sub, wherein the top sub and the bottom sub are coupled at opposite ends of a housing, and wherein the top sub has a plurality of ports extending from an outer surface of the top sub to an inner surface of the top sub and configured to allow wellbore fluids to flow into the upper separator.

12. The production string of claim 11, wherein the upper separator further comprises a gas plug disposed in the top sub, wherein the inner tube is coupled to the gas plug, and wherein the ports of the top sub are located near an upper end of the inner tube.

13. The production string of claim 12, wherein the lower separator comprises a spinner body coupled to a cyclone housing, and wherein an upper end of the spinner body has a plurality of ports extending from an outer surface of the spinner body to an inner surface of the spinner body and configured to allow wellbore fluids to flow out of the lower separator.

14. The production string of claim 13, wherein a lower end of the spinner body has a plurality of helically arranged fins configured to create a vortex or cyclone of the wellbore fluids flowing into the lower separator.

15. The production string of claim 14, wherein the wellbore fluids can flow into the lower separator through a port in the cyclone housing, the port extending from an outer surface of the cyclone housing to an inner surface of the cyclone housing.

16. The production string of claim 15, wherein a lower end of the cyclone housing has an inner tapered flow bore.

17. The production string of claim 15, wherein the lower separator further comprises a packing element, and the port in the cyclone housing is located below the packing element, and the plurality of ports of the spinner body are located above the packing element.

18. A sand and gas separation system for use with a rod pump, comprising:
    an upper separator, the upper separator comprising:
        a top sub, the top sub comprising a plurality of inlet ports extending from an outer surface of the top sub to an inner surface of the top sub to allow fluids to flow from a wellbore annulus and into the upper separator,
        an inner tube, and
        a gas separation annulus between the inner surface of the top sub and an outer surface of the inner tube, wherein the upper separator is configured to separate out gas from the fluids flowing into the upper separator prior to flowing into the rod pump; and
    a lower separator, the lower separator comprising:
        a cyclone housing, the cyclone housing comprising an inlet port extending from an outer surface of the cyclone housing to an inner surface of the cyclone housing to allow fluids to flow from the wellbore annulus and into the lower separator, and
        a spinner body coupled to the cyclone housing, the spinner body comprising a plurality of outlet ports extending from an outer surface of the spinner body to an inner surface of the spinner body to allow the fluids flowing into the lower separator to flow out of the lower separator and into the wellbore annulus, wherein the plurality of outlet ports of the spinner body are disposed below the plurality of inlet ports of the top sub, and the inlet port of the cyclone housing is disposed below the plurality of outlet ports of the spinner body, wherein the spinner body is configured to separate out sand from the fluids flowing into the lower separator prior to flowing into the upper separator through the wellbore annulus.

19. The system of claim 18, wherein the upper and lower separators are coupled together by a mechanical coupling.

20. The system of claim 18, wherein the lower separator further comprises a packing element disposed in the wellbore annulus, the packing element being disposed below the plurality of outlet ports of the spinner body and above the inlet port of the cyclone housing.

* * * * *